United States Patent
Liao et al.

(10) Patent No.: US 11,767,391 B2
(45) Date of Patent: *Sep. 26, 2023

(54) CURING AGENT COMPOSITION AND CURING AGENT COATING FORMULA THEREOF

(71) Applicant: NAN YA PLASTICS CORPORATION, Taipei (TW)

(72) Inventors: Te-Chao Liao, Taipei (TW); Sen-Huang Hsu, Taipei (TW); Chung-Chi Su, Taipei (TW); Chuan Chou, Taipei (TW); Jui-Jung Lin, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 495 days.

This patent is subject to a terminal disclaimer.

(21) Appl. No.: 16/887,006

(22) Filed: May 29, 2020

(65) Prior Publication Data

US 2021/0139628 A1 May 13, 2021

(30) Foreign Application Priority Data

Nov. 13, 2019 (TW) ................................ 108141074

(51) Int. Cl.
| | | |
|---|---|---|
| *C08F 283/01* | (2006.01) | |
| *C09D 167/00* | (2006.01) | |
| *C08G 63/91* | (2006.01) | |
| *C08G 63/685* | (2006.01) | |
| *C08G 59/50* | (2006.01) | |
| *C08G 59/40* | (2006.01) | |
| *C08G 63/68* | (2006.01) | |
| *C08G 59/56* | (2006.01) | |
| *C08G 59/18* | (2006.01) | |
| *C08G 59/42* | (2006.01) | |
| *C08K 3/08* | (2006.01) | |
| *C09D 167/02* | (2006.01) | |
| *C08L 63/00* | (2006.01) | |
| *C08L 67/02* | (2006.01) | |
| *C08L 67/00* | (2006.01) | |
| *C09D 5/10* | (2006.01) | |
| *C09D 163/00* | (2006.01) | |
| *C09D 7/63* | (2018.01) | |

(52) U.S. Cl.
CPC .......... *C08F 283/01* (2013.01); *C09D 167/00* (2013.01); *C08G 59/18* (2013.01); *C08G 59/184* (2013.01); *C08G 59/40* (2013.01); *C08G 59/4014* (2013.01); *C08G 59/42* (2013.01); *C08G 59/4276* (2013.01); *C08G 59/50* (2013.01); *C08G 59/5013* (2013.01); *C08G 59/56* (2013.01); *C08G 63/68* (2013.01); *C08G 63/685* (2013.01); *C08G 63/6854* (2013.01); *C08G 63/6856* (2013.01); *C08G 63/91* (2013.01); *C08G 63/914* (2013.01); *C08G 63/916* (2013.01); *C08K 2003/0812* (2013.01); *C08K 2003/0893* (2013.01); *C08L 63/00* (2013.01); *C08L 67/00* (2013.01); *C08L 67/02* (2013.01); *C09D 5/10* (2013.01); *C09D 5/103* (2013.01); *C09D 5/106* (2013.01); *C09D 7/63* (2018.01); *C09D 163/00* (2013.01); *C09D 167/02* (2013.01)

(58) Field of Classification Search
None
See application file for complete search history.

(56) References Cited

U.S. PATENT DOCUMENTS

| | | | | |
|---|---|---|---|---|
| 4,797,464 | A * | 1/1989 | Nodelman | C08G 63/42 528/297 |
| 6,136,894 | A * | 10/2000 | Stark | C08G 59/184 523/420 |
| 6,160,040 | A * | 12/2000 | Ghosh | C08G 59/625 523/438 |
| 7,008,979 | B2 | 3/2006 | Schottman et al. | |
| 7,645,829 | B2 | 1/2010 | Tse et al. | |
| 2001/0031362 | A1* | 10/2001 | Abrami | C08G 59/4085 523/425 |
| 2004/0077790 | A1* | 4/2004 | Kunimasa | C09D 133/02 525/100 |
| 2013/0022748 | A1* | 1/2013 | Kim | B05D 7/16 977/773 |
| 2013/0072597 | A1* | 3/2013 | Elmore | C08L 63/00 523/400 |
| 2015/0284562 | A1* | 10/2015 | Feng | C08J 5/04 523/427 |
| 2020/0157340 | A1* | 5/2020 | Miyatake | C08F 279/02 |
| 2021/0122876 | A1* | 4/2021 | Liao | C08L 71/08 |

FOREIGN PATENT DOCUMENTS

| | | | |
|---|---|---|---|
| CN | 1278844 | A | 1/2001 |
| CN | 104136559 | A | 11/2014 |
| CN | 105367755 | A * | 3/2016 |
| CN | 106147517 | A | 11/2016 |
| CN | 106497259 | A | 3/2017 |
| CN | 109485830 | A | 3/2019 |
| CN | 109485830 | A * | 9/2019 |
| EP | 2931818 | B1 | 10/2016 |
| JP | 07-206982 | A * | 8/1995 |
| JP | 09-235454 | A * | 9/1997 |
| JP | 9235354 | A | 9/1997 |
| JP | 2008202122 | A | 9/2008 |
| JP | 4537377 | B2 | 9/2010 |
| JP | 2013-006956 | A * | 1/2013 |
| JP | 20136956 | A | 1/2013 |
| TW | 201625705 | A | 7/2016 |

\* cited by examiner

*Primary Examiner* — Vivian Chen
(74) *Attorney, Agent, or Firm* — Li & Cai Intellectual Propeny (USA) Office

(57) ABSTRACT

A curing agent composition and a curing agent coating formula thereof are provided. The curing agent composition includes 5 to 25 wt % of an ester group-containing amine end group adduct, 2 to 25 wt % of a C8-C22 hydrophobic saturated or unsaturated fatty amine, 2 to 25 wt % of a polyamine compound, 2 to 20 wt % of a silane compound, and 10 to 60 wt % of an ether solvent.

10 Claims, No Drawings

CURING AGENT COMPOSITION AND CURING AGENT COATING FORMULA THEREOF

CROSS-REFERENCE TO RELATED PATENT APPLICATION

This application claims the benefit of priority to Taiwan Patent Application No. 108141074, filed on Nov. 13, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a curing agent composition and a curing agent coating formula, and more particularly to an anhydrous curing agent composition for aqueous epoxy resin dispersion.

BACKGROUND OF THE DISCLOSURE

In the conventional art, compositions combined with aqueous epoxy resins and hardening agents frequently face the problem of short storage life, especially in the case of compositions containing metals, such as zinc-rich primers.

Zinc-rich primer has excellent corrosion resistance and is widely used in various industrial anti-corrosion fields. The main anticorrosion principle of zinc-rich primer coating is to protect the metal layer (cathode) by consuming the zinc powder (anode) in the coating in a corrosive environment. However, since metal powder such as zinc powder has the property of high activity, it easily reacts with water and releases hydrogen, which not only affects product performance, but also raises safety concerns. Therefore, it is difficult to achieve a longer shelf life.

In addition, the conventional art still has the problems of complicated manufacturing process, high cost, and poor salt spray resistance. In order to overcome the aforementioned defects, for the purpose of simplifying the manufacturing process and reducing the cost, how the salt spray resistance, corrosion resistance and impact resistance of the product can be further improved, thus satisfying the needs of the market, has become one of the important issues to be solved.

SUMMARY OF THE DISCLOSURE

In response to the above-referenced technical inadequacies, the present disclosure provides an anhydrous curing agent composition for aqueous epoxy resin dispersion, which can be further applied to the field of zinc-rich primer.

In one aspect, the present disclosure provides a curing agent composition, comprising: 5 to 25 wt % of an ester group-containing amine end group adduct; 2 to 25 wt % of a C8-C22 hydrophobic saturated or unsaturated fatty amine; 2 to 25 wt % of a polyamine compound; 2 to 20 wt % of a silane compound; and 10 to 60 wt % of an ether solvent; in which, the ester group-containing amine end group adduct includes chemical formula:

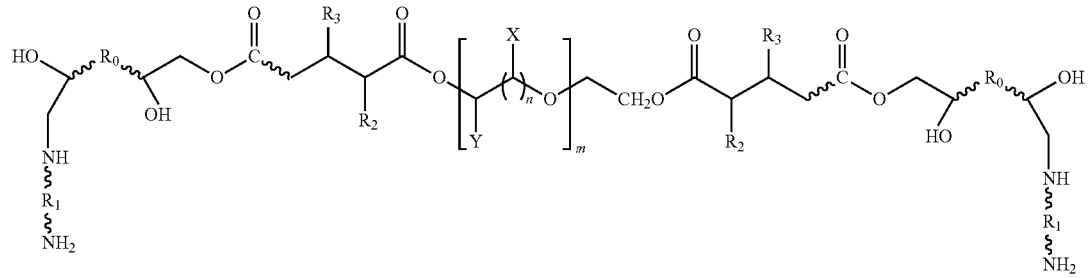

wherein, m=1-100, n=1-15, X and Y are each independently selected from H, methyl, ethyl, and hydroxymethyl; $R_1$ is a C2-C18 aliphatic, cycloaliphatic, or aromatic group unsubstituted or substituted with non-reactive oxygen, or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring; $R_0$ is a C6-C30 hydrocarbon group having at least one aromatic ring, and substituted or unsubstituted with oxygen atom, nitrogen atom, sulfur atom, or a C6-C17 aliphatic hydrocarbon group.

In certain embodiments, the C8-C22 hydrophobic saturated or unsaturated fatty amine is 9-octadecenylamine.

In certain embodiments, the polyamine compound is a polyetheramine compound or a polyethoxytallowamine compound.

In certain embodiments, the silane compound is an amine silane compound or an epoxy silane compound.

In certain embodiments, the ether solvent is selected from the group consisting of propylene glycol methyl ether, dipropylene glycol dimethyl ether, and dipropylene glycol methyl ether.

In certain embodiments, the ester group-containing amine end group adduct is an end-capping hardening agent obtained by an end-capping reaction with a monofunctional epoxy compound, including chemical formula:

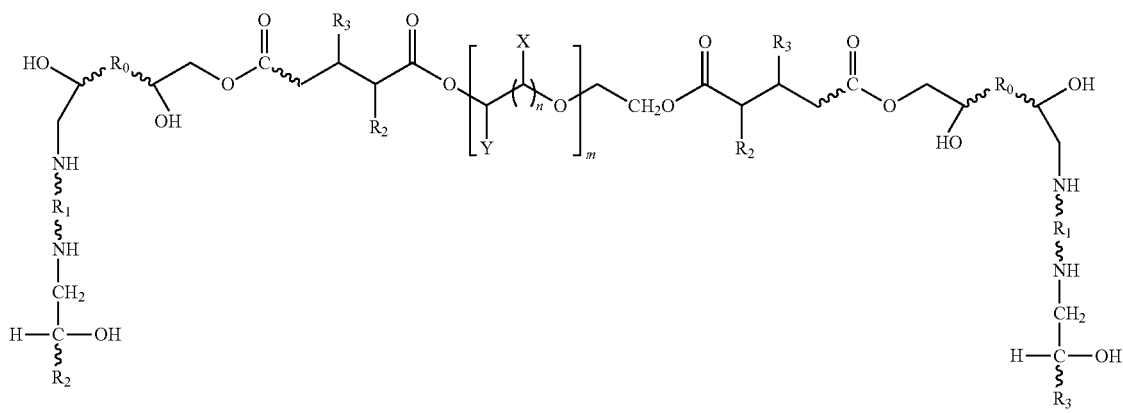

wherein, m=1-100, n=1-15, X and Y are each independently selected from H, methyl, ethyl, hydroxymethylmethyl, ethyl, and hydroxymethyl; $R_1$ is a C2-C18 aliphatic, cycloaliphatic, or aromatic group unsubstituted or substituted with non-reactive oxygen, or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring; $R_0$ is a C6-C30 hydrocarbon group having at least one aromatic ring, and substituted or unsubstituted with oxygen atom, nitrogen atom, or sulfur atom, or is a C6-C17 aliphatic hydrocarbon group.

In certain embodiments, the monofunctional epoxy compound is selected from a group consisting of 1,2-hexene oxide, 1,2-heptene oxide, iso-heptene oxide, 1,2-octene oxide, 1, 2-dodecene monoxide, 1,2-pentadecenylene oxide, butadiene monoxide, isoprene monoxide, styrenated oxide, methyl glycidyl ether, ethyl glycidyl ether, phenyl glycidyl ether, n-butyl glycidyl ether, tolyl glycidyl ether, isopropyl glycidyl ether, benzyl glycidyl ether, glycidyloxypropyl trimethoxysilyl, octyl glycidyl ether, nonyl glycidyl ether, decyl glycidyl ether, dodecyl glycidyl ether, tetradecyl glycidyl ether, p-tert-butylphenyl glycidyl ether, and o-tolyl glycidyl ether In another aspect, the present disclosure provides a curing agent coating formula, including: 10 to 30 wt % of aqueous epoxy resin; 1 to 10 wt % of the aforementioned curing agent composition; 0.1 to 5 wt % of dispersant; 1 to 5 wt % of rheological agent; 1 to 10 wt % of film forming agent; 5 to 30 wt % of solvent; and 10 to 70 wt % of metal powder.

In certain embodiments, the metal powder is selected from the group consisting of zinc powder, aluminum powder, and magnesium powder.

In certain embodiments, the film-forming agent is selected from the group consisting of propylene glycol monomethyl ether or dipropylene glycol butyl ether or a combination thereof.

Therefore, the curing agent composition for zinc-rich primer of the present disclosure provides a specific proportion, such that the present disclosure reduces the complicated process and cost, and further improves the salt spray resistance, corrosion resistance and impact resistance of the product.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides an anhydrous curing agent composition for an aqueous epoxy resin dispersion. Furthermore, it can be applied to the field of zinc-rich primer.

The present disclosure provides a curing agent composition, including: 5 to 25 wt % of an ester group-containing amine end group adduct; 2 to 25 wt % of a C8-C22 hydrophobic saturated or unsaturated fatty amine; 2 to 25 wt % of a polyamine compound; 2 to 20 wt % of a silane compound; and 10 to 60 wt % of an ether solvent; in which, the ester group-containing amine end group adduct includes chemical formula:

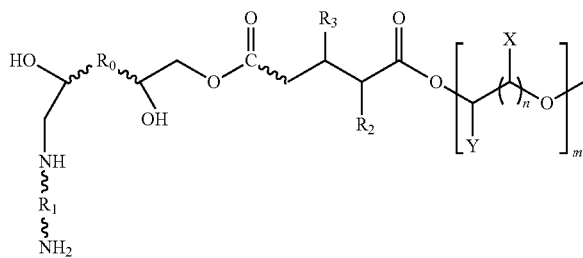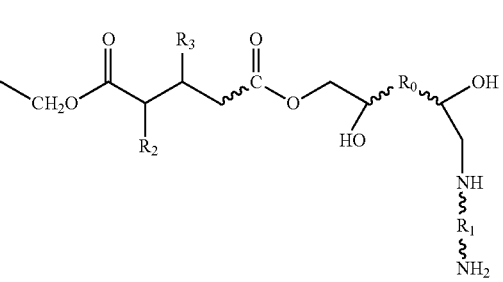

wherein, m=1-100, n=1-15, X and Y are each independently selected from H, methyl, ethyl, and hydroxymethyl; $R_1$ is a C2-C18 aliphatic, cycloaliphatic, or aromatic group unsubstituted or substituted with non-reactive oxygen, or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring; $R_0$ is a C6-C30 hydrocarbon group having at least one aromatic ring, and substituted or unsubstituted with oxygen atom, nitrogen atom, sulfur atom, or a C6-C17 aliphatic hydrocarbon group In an embodiment of the present disclosure, the C8-C22 hydrophobic saturated or unsaturated fatty amine is 9-octadecenylamine. The content of the C8-C22 hydrophobic saturated or unsaturated fatty amine is 2 to 25 wt %, preferably 8 to 12 wt %.

In an embodiment of the present disclosure, the polyamine compound is selected from the group consisting of a polyetheramine compound and a polyethoxytallowamine compound. The content the polyamine compound is 2 to 25 wt %, preferably 8 to 12 wt %. Specifically, a polyetheramine is a compound having a primary amino group or a secondary amino group as a reactive group at one or both ends of a resin having a polyether skeleton. For example, it can be commercially available products, such as Huntsman's Jeffamine® D230, D400, D2000, T403, T3000, T5000, and etc.

In an embodiment of the present disclosure, the silane compound is an amine silane compound or an epoxy silane compound, the content of the silane compound is 2 to 20 wt %, preferably 5 to 10 wt %. The silane compound has coating properties to metal powder. For example, the epoxy silane compound can be 3-glycidoxypropyltrimethoxysilane, 3-glycidoxypropyltriethoxysilane, 3-glycidyl oxypropylmethyldiethoxy silane, and 2-(3,4-epoxycyclohexyl) ethyldimethoxysilane, such as commercially available products, Momentive A186, A187, A1871, CoatOSil 2287, CoatOSil 1770, or ShinEtsu KBM303, KBM403, KBE402, and KBE403. The amino silane compound may be N-(2-aminoethyl) 3-aminopropylmethyldimethoxysilane, N-(2-aminoethyl) 3-aminopropyltrimethoxysilane, 3-aminopropyltriethoxysilane, such as commercially available products, Momentive A1100, A1120, A1130, A1170 and A2120, ShinEtsu KBM602, KBM603, KBM903, KBE603 and KBE903.

In an embodiment of the present disclosure, the ether solvent is selected from the group consisting of propylene glycol methyl ether, dipropylene glycol dimethyl ether, and dipropylene glycol methyl ether. The content of the ether solvent is 10 to 60 wt %, preferably 25 to 35 wt %.

Furthermore, the ester group-containing amine end group adduct of the present disclosure is obtained by a specific manufacturing method, including: step S100 (esterification step), producing an esterification reaction of a polyanhydride and a polyol to obtain an ester-based emulsifier; step S200 (chain extension step), reacting the ester-based emulsifier with a bifunctional epoxy compound to obtain a polymer intermediate; step S300, reacting the polymer intermediate with a polyamine compound to obtain an ester group-containing amine end group adduct, and step S400 (end-capping step), reacting the ester group-containing amine end group adduct with a monofunctional epoxy compound.

Specifically, in step S100, a polyol and a polyanhydride are mixed at a ratio of 1.1:1 in a nitrogen atmosphere, and reacted at a temperature between 110 and 130° C. for 3 hours to produce the esterification reaction between the polyol and the polyanhydride to obtain an ester-based emulsifier (A), having a chemical formula:

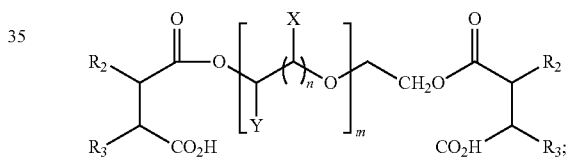

wherein, m=1-100, n=1-15, X and Y are each independently selected from H, methyl, ethyl, and hydroxymethyl; $R_2$ and $R_3$ are each independently selected from H, substituted or unsubstituted alkyl, substituted or unsubstituted aryl, or $R_2$ and $R_3$ are bonded to each other to form a substituted or unsubstituted ring.

Further, the polyol of the present disclosure has a following chemical formula:

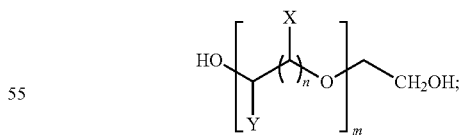

wherein, m=1-100, n=1-15, X and Y are each independently selected from H, methyl, ethyl, and hydroxymethyl, preferably, the polyol polymer has a molecular weight between 200 and 8000, and more preferably the polyol polymer is polyethylene glycol with a molecular weight between 200 and 8000. The high molecular weight polyethylene glycol (PEG) may be selected from: PEG 200, PEG 400, PEG 1000, PEG 2000, PEG 3000, PEG 6000, and PEG 8000.

Furthermore, the polyanhydride has a following chemical formula:

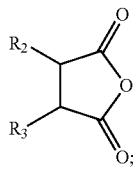

wherein, $R_2$ and $R_3$ are each independently selected from H, substituted or unsubstituted alkyl, substituted or unsubstituted aryl, or $R_2$ and $R_3$ are bonded to each other to form a substituted or unsubstituted ring.

For example, the polyanhydride is selected from the group consisting of succinic anhydride (SA), maleic anhydride (MA), phthalic anhydride (PA), cyclohexanedicarboxylic anhydride (CDA), tetrahydrophthalic anhydride (TPA), and methylhexahydrophthalic anhydride (MHHPA).

S200 (chain extension step): the ester-based emulsifier (A) is mixed with a bifunctional epoxy resin to perform a chain extension reaction in an equivalent ratio of 0.05:1, and the reaction conditions of the chain extension step are firstly reacting at a temperature of 110 to 130° C. for 1 hour, then reacting at a temperature of 130 to 150° C. for 2 hours to obtain a polymer intermediate (B), which has a chemical formula:

carboxylic acids. The bifunctional epoxy resin of the present disclosure has a following chemical formula:

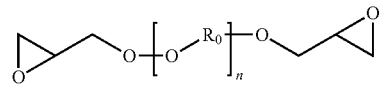

wherein, n is a natural number, n=1-10, $R_0$ is a C6-C30 hydrocarbon group having at least one aromatic ring, and substituted or unsubstituted with oxygen atom, nitrogen atom, sulfur atom, or a C6-C17 aliphatic hydrocarbon group.

For example, the bifunctional epoxy resin may be selected from a group consisting of bisphenol-type diglycidyl ether, branched or linear aliphatic glycidyl ether, epoxy phenolic resin, or alicyclic epoxy resin.

Furthermore, a bisphenol-type diglycidyl ether can be produced by reacting an epihalohydrin with a bisphenol in the presence of a base. For example, the bisphenol can be selected from a group consisting of 2,2-bis (4-hydroxyphenyl) propane (bisphenol-A), 2,2-bis (4-hydroxy-3-tert-butylphenyl) propane, 1, 1-bis (4-hydroxyphenyl) ethane, 1,1-bis (4-hydroxyphenyl) isobutane, bis (2-hydroxy-1-naphthyl) methane, 1,5-dihydroxy naphthalene and 1,1-bis (4-hydroxy-3-alkylphenyl) ethane.

The aliphatic glycidyl ether may be selected from 1,4-butanediol, neopentyl glycol, cyclohexanedimethanol, hexanediol, polypropylene glycol, and diol-like diglycidyl

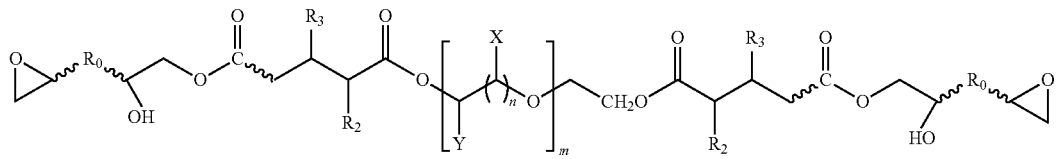

$R_0$ is a C6-C30 hydrocarbon group having at least one aromatic ring, and substituted or unsubstituted with oxygen atom, nitrogen atom, sulfur atom, or a C6-C17 aliphatic hydrocarbon group; wherein, m=1-100, n=1-15, X and Y are each independently selected from H, methyl, ethyl, and hydroxymethyl; $R_2$ and $R_3$ are each independently selected from H, substituted or unsubstituted alkyl, substituted or unsubstituted aryl, or $R_2$ and $R_3$ are bonded to each other to form a substituted or unsubstituted ring.

The bifunctional epoxy resin refers to resin with two or more epoxy groups in one molecule, such as epoxy group formed by an oxidation reaction of an olefin, a glycidyl etherification reaction of a hydroxyl group, glycidylation of primary or secondary amines, or glycidyl esterification of ether, trimethylol triglycidyl ether of trimethylol and trimethylolpropane. Examples of the alicyclic epoxy resins are: 3,4-epoxycyclohexylmethyl-(3,4-epoxy) cyclohexane carboxylate, dialicyclic diether diepoxy [2-(3,4-epoxy) cyclohexyl-5,5-spiro (3,4-epoxy)-cyclohexane-m-dioxane], bis (3, 4-epoxy-cyclohexylmethyl) hexyl diesters, bis (3,4-epoxy-cyclohexyl) adipate, and vinyl cyclohexene dioxide [4-(1,2-epoxyethyl)-1,2-epoxy ring hexane].

Step S300: mixing the polymer intermediate (B) with the polyamine compound at an equivalent ratio of 0.2:1, and reacting at a temperature of 70° C. for 4 hours to obtain a hardening agent (C), which has a chemical formula:

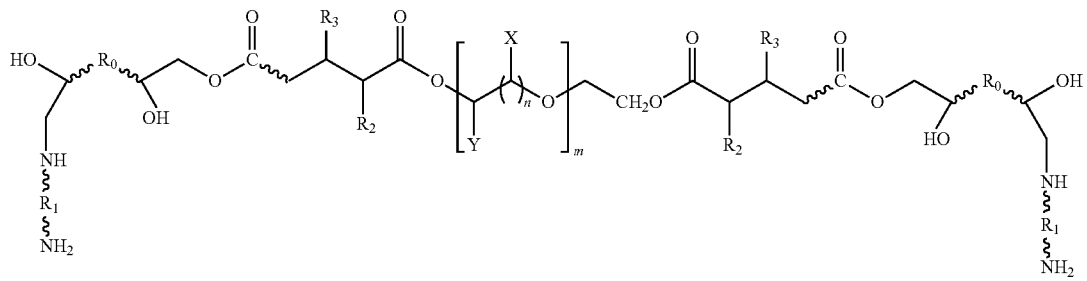

wherein, m=1-100, n=1-15, X and Y are each independently selected from H, methyl, ethyl, and hydroxymethyl; $R_1$ is a C2-C18 aliphatic, cycloaliphatic, or aromatic group unsubstituted or substituted with non-reactive oxygen, or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring; $R_0$ is a C6-C30 hydrocarbon group having at least one aromatic ring, and substituted or unsubstituted with oxygen atom, nitrogen atom, sulfur atom, or a C6-C17 aliphatic hydrocarbon group.

Furthermore, the polyamine compound is selected from a group consisting of m-xylylenediamine, 1,3-bis (aminomethyl) cyclohexane, 2-methyl-1,5-pentanediamine, 1,3-pentanediamine, ethylenediamine, diethylenetriamine, triethylenetetramine, polypropylene oxide diamine, 2,2 (4), 4-trimethyl 1,6-hexanediamine, isophorone diamine, 2,4-toluenediamine, 1,6-hexanediamine, 1,2-diaminocyclohexane and p-diaminodicyclohexylmethane (PACM).

In addition, step S400 (end-capping step) is optionally further performed. Reacting the hardening agent (C) and the monofunctional epoxy compound at 70° C. for 2 hours, and then cooled to 60° C., and stirred with deionized water at a speed of 200 rpm to be mixed for 1 hour to obtain a hardening agent (D):

epoxy resins. Therefore, double advantages are obtained, that is, sufficient reactivity is maintained at room temperature without external catalyst to cure the system, while alleviating the whitening phenomenon. Reacting with the monofunctional epoxy compound further forms hydroxyl groups, which can also be used to react with epoxy components.

The monofunctional epoxy compound is selected from the group consisting of 1,2-hexene oxide, 1,2-heptene oxide, iso-heptene oxide, 1,2-octene oxide, 1,2-dodecene monoxide, 1,2-pentadecenylene oxide, butadiene monoxide, isoprene monoxide, styrenated oxide, methyl glycidyl ether, ethyl glycidyl ether, phenyl glycidyl ether, n-butyl glycidyl ether, tolyl glycidyl ether, isopropyl glycidyl ether, benzyl glycidyl ether, glycidyloxypropyl trimethoxysilyl, octyl glycidyl ether, nonyl glycidyl ether, decyl glycidyl ether, dodecyl glycidyl ether, tetradecyl glycidyl ether, p-tert-butylphenyl glycidyl ether, and o-tolyl glycidyl ether.

The curing agent composition of the present disclosure further provides an application formula. Specifically, the present disclosure provides a curing agent coating formula, including: 10 to 30 wt % of the aqueous epoxy resin, 1 to 10 wt % of the aforementioned curing agent composition, 0.1 to 5 wt % dispersant, 1 to 5 wt % of rheological agent, 1 to 10 wt % of film forming agent, 5 to 30 wt % of solvent, and 10 to 70 wt % of metal powder.

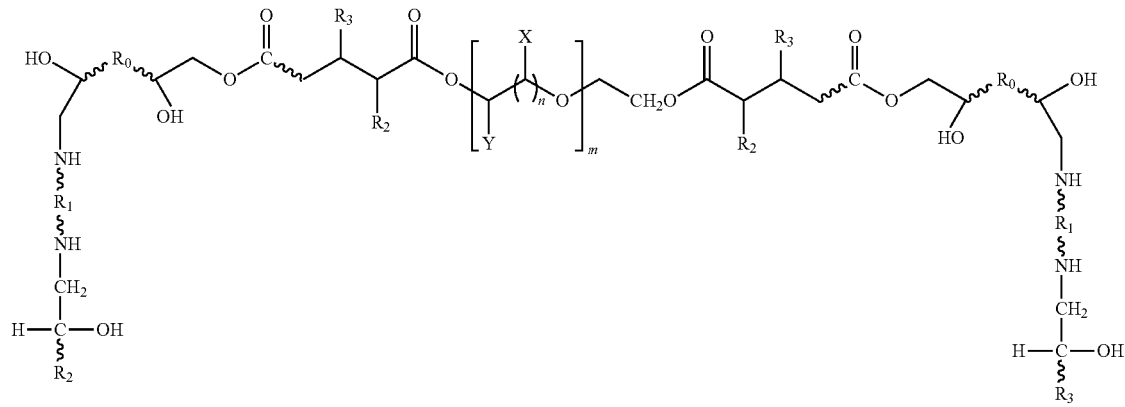

wherein, $R_X$ is as shown in the previous chemical formula ($R_0$ and $R_5$ are as described above), $R_1$ is a C2-C18 aliphatic, substituted or unsubstituted by non-reactive active oxygen, at most 4 secondary or tertiary nitrogen atoms alicyclic or aromatic groups; $R_3$ is selected from the group consisting of branched or linear alkyl, alicyclic, polyoxyalkyl or alkenyl groups of 2-100 carbon atoms.

In more detail, the monofunctional epoxy compound as an end-capping agent may be an aliphatic, alicyclic, or aromatic compound attached to an epoxy functional group. Thereby, the monofunctional epoxy allows the hydrogen reaction of the primary amine, which reduces the chance that the atmospheric temperature reacts with the hydrogen of the primary amine to form a carbamate. Reacting amide polyamines with the epoxy functional groups not only alleviates whitening phenomenon through depleting some or all of primary amine groups of substituted arylamide polyamines, further leave an advantage of a free amine hydrogen that is reactive with the epoxy groups. Nonetheless, reacting the primary amine on the amide-based polyamine compound with the epoxy functional group provides a secondary amine hydrogen that is more reactive with More preferably, the aqueous epoxy resin may be 10 to 30 wt %, 10 to 25 wt %, 10 to 20 wt %, 10 to 15 wt %, 11 to 30 wt %, 11 to 25 wt %, 11 to 20 wt % %, 11 to 15 wt %, 12 to 30 wt %, 12 to 25 wt %, 12 to 20 wt %, 12 to 15 wt %, 13 to 30 wt %, 13 to 25 wt %, 13 to 20 wt %, 13 to 15 wt %, 14 to 30 wt %, 14 to 25 wt %, 14 to 20 wt %, 14 to 15 wt %, 15 to 30 wt %, 15 to 25 wt %, 15 to 20 wt %, 16 to 30 wt %, 16 to 25 wt %, 16 to 20 wt %, 17 to 30 wt %, 17 to 25 wt %, 17 to 20 wt %, 18 to 30 wt %, 18 to 25 wt %, 18 to 20 wt % %, 19 to 30 wt %, 19 to 25 wt %, 19 to 20 wt %, 20 to 30 wt %, 20 to 25 wt %, 21 to 30 wt %, 21 to 25 wt %, 22 to 30 wt %, 22 to 25 wt %, 23 to 30 wt %, 24 to 25 wt %, 25 to 30 wt %, 26 to 30 wt %, 27 to 30 wt %, 28 to 30 wt % or 29 to 30 wt %.

More preferably, the solvent may be 5 to 30 wt %, 10 to 20 wt %, or 15 to 20 wt %.

More preferably, the aforementioned curing agent composition may be 1 to 10 wt %, 2 to 10 wt %, 3 to 10 wt %, 4 to 10 wt %, 5 to 10 wt %, 6 to 10 wt %, 7 to 10 wt %, 8 to 10 wt %, or 9 to 10 wt %.

In an embodiment of the present disclosure, the metal powder is selected from the group consisting of zinc powder, aluminum powder, and magnesium powder, and a mixture of the aforementioned metal powder, and includes alloy and intermetallic mixture, the content of which is 10 to 70 wt %. In more detail, the metal powder may be in the form of powder, granules or flakes, and dispersed in powder or paste. The metal powder generally has a particle size such that all particles pass through a 100-mesh sieve ("mesh" used herein is the American Standard Sieve Series).

Specifically, the aqueous epoxy resin may be selected from commercially available products, such as Huntsman Araldite® PZ 3901, 3921, 3961-1, Hexion EPI-REZ Resin 3520, EPIKOTE 6520-WH-53, and combinations thereof.

In an embodiment of the present disclosure, the film-forming agent is propylene glycol monomethyl ether or dipropylene glycol butyl ether, or a combination thereof.

In an embodiment of the present disclosure, the dispersant and rheological agent can be selected from commercially available products, such as BYK-190 for dispersant, BYK-425 for rheological agent.

Manufacturing Embodiment

Preparation processes of the ester group-containing amine end group adduct of the present disclosure are as follows.

Under a nitrogen atmosphere, mixing 100 g polyethylene glycol PEG6000 and 5.3 g methylhexahydrophthalic anhydride (MHHPA), and reacting at 120° C. for 3 hours, which produces an esterification reaction to obtain 105.3 g ester-based emulsifier (A).

Mixing 105 g ester-based emulsifier (A) with 258 g Nanya Plastics epoxy resin NPEL-136 for chain extension reaction, and reacting at 120° C. for 1 hour, and then 140° C. for 2 hours, to obtain a polymer intermediate (B).

Mixing 175 g polymer intermediate (B) with excess diethylenetriamine (DETA), reacting at 70° C. for 4 hours, and removing excess DETA to obtain an ester group-containing amine end group adduct (C).

Further, adding 55.6 g n-butyl glycidyl ether (BGE) for an end-capping reaction, and reacting at 70° C. for 2 hours, and then lowering the temperature to 60° C., and adding 280 g of deionized water and stirring at a constant speed of 200 rpm for 1 hour, to obtain an end-blocked ester group-containing amine end group adduct (D).

Embodiments 1-3

Preparation processes of curing agent composition of the present disclosure are as follows.

The end-blocked ester group-containing amine end group adduct (D), oleylamine, polyamine compound, and silane compound prepared according to the formulations in Table 1 below are mixed with appropriate amounts of propylene glycol methyl ether as a solvent, stirring at 200 rpm/min for 60 minutes in high-speed mechanical to obtain the curing agent composition of the present disclosure.

TABLE 1

| Component content (wt %) | Embodiment 1 | Embodiment 2 | Embodiment 3 |
| --- | --- | --- | --- |
| end-blocked ester group-containing amine end group adduct (D) | 14.5 | 19.6 | 25.0 |
| oleylamine | 12.3 | 9.8 | 7.2 |
| polyamine compound (Jeffamine T5000) | 19.8 | 13.6 | 9.5 |

TABLE 1-continued

| Component content (wt %) | Embodiment 1 | Embodiment 2 | Embodiment 3 |
| --- | --- | --- | --- |
| silane compound (ShinEtsu KBM303) | 9.5 | 8.3 | 6.5 |
| propylene glycol methyl ether | 43.9 | 48.7 | 51.8 |

The curing agent composition in Table 1 is prepared as a coating (wt %) according to the formulation in Table 2:

TABLE 2

| Coating formulation | Weight (g) | wt % |
| --- | --- | --- |
| the curing agent composition of Embodiment 1 | 7.90 | 5.22 |
| dispersant BYK-190 | 0.62 | 0.41 |
| rheological agent BYK-425 | 2.52 | 1.66 |
| zinc powder | 83.81 | 55.37 |
| film-forming agent (Propylene glycol monomethyl ether, PM) | 3.15 | 2.08 |
| film-forming agent (dipropylene glycol butyl ether, DPNB) | 2.00 | 1.32 |
| aqueous epoxy resin * | 26.36 | 17.42 |
| deionized water | 25.00 | 16.52 |

Aqueous epoxy resin *:
Huntsman Araldite ® PZ 3901, 3921, 3961-1
Hexion EPI-REZ Resin 3520
EPIKOTE 6520-WH-53

In conclusion, the curing agent composition effectively reduces the complicated process and cost, and improves the salt spray resistance, corrosion resistance and impact resistance of the product.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A curing agent composition, comprising:

5 to 25 wt % of an ester group-containing amine end group adduct;

2 to 25 wt % of a C8-C22 hydrophobic saturated or unsaturated fatty amine;

2 to 25 wt % of a polyamine compound;

2 to 20 wt % of a silane compound; and 10 to 60 wt % of an ether solvent;

wherein the ester group-containing amine end group adduct has a chemical formula of:

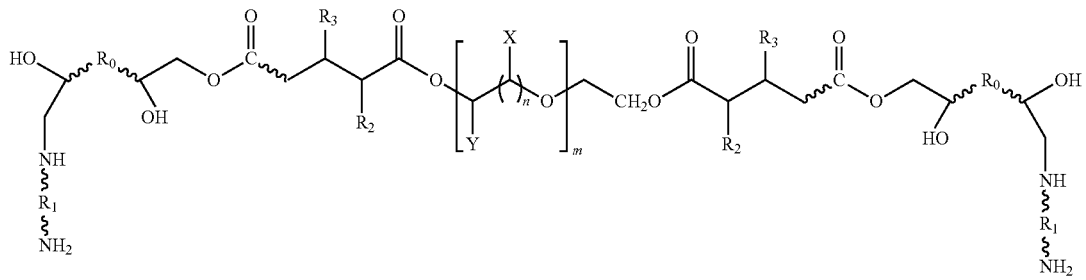

wherein m=1-100, n=1-15, X and Y are each independently selected from H, methyl, ethyl, and hydroxymethyl; $R_1$ is a C2-C18 aliphatic, cycloaliphatic, or aromatic group unsubstituted or substituted with non-reactive oxygen, or up to an average of 4 secondary or tertiary nitrogen atoms; $R_2$ and $R_3$ are each independently selected from H, substituted or unsubstituted alkyl, substituted or unsubstituted aryl, or $R_2$ and $R_3$ are bonded to each other to form a substituted or unsubstituted ring; $R_0$ is a C6-C30 hydrocarbon group having at least one aromatic ring, and substituted or unsubstituted with oxygen atom, nitrogen atom, sulfur atom, or a C6-C17 aliphatic hydrocarbon group;

wherein the ester group-containing amine end group adduct is obtained by the following steps in a recited order:

(a) an esterification step, wherein the esterification step is mixing a polyol and a polyanhydride at a ratio of 1.1:1 and reacting the polyol and the polyanhydride at a temperature between 110 and 130° C., thereby producing an ester-based emulsifier;

(b) a chain extension step, wherein the chain extension step is reacting the ester-based emulsifier with a bifunctional epoxy resin in an equivalent ratio of 0.05:1 under a reaction conditions of the chain extension step are firstly reacting at a temperature of 110 to 130° C. for 1 hour, then reacting at a temperature of 130 to 150° C. for 2 hours, thereby producing a polymer intermediate; and (c) reacting the polymer intermediate and a polyamine compound with an equivalent ratio of 0.2:1 at a temperature of 70° C. for 4 hours, thereby producing the ester group-containing amine end group adduct.

2. The curing agent composition according to claim 1, wherein the C8-C22 hydrophobic saturated or unsaturated fatty amine is 9-octadecenylamine.

3. The curing agent composition according to claim 1, wherein the polyamine compound is a polyetheramine compound or a polyethoxytallowamine compound.

4. The curing agent composition according to claim 1, wherein the silane compound is an amine silane compound or an epoxy silane compound.

5. The curing agent composition according to claim 1, wherein the ether solvent is selected from a group consisting of propylene glycol methyl ether, dipropylene glycol dimethyl ether, and dipropylene glycol methyl ether.

6. The curing agent composition according to claim 1, wherein the ester group-containing amine end group adduct is further end-capped, wherein the end-capped ester group-containing amine end group adduct is obtained by an end-capping reaction between the ester group-containing amine end group adduct and a monofunctional epoxy compound, thereby producing an end-capped hardening agent, wherein the end-capped hardening agent has a chemical formula of:

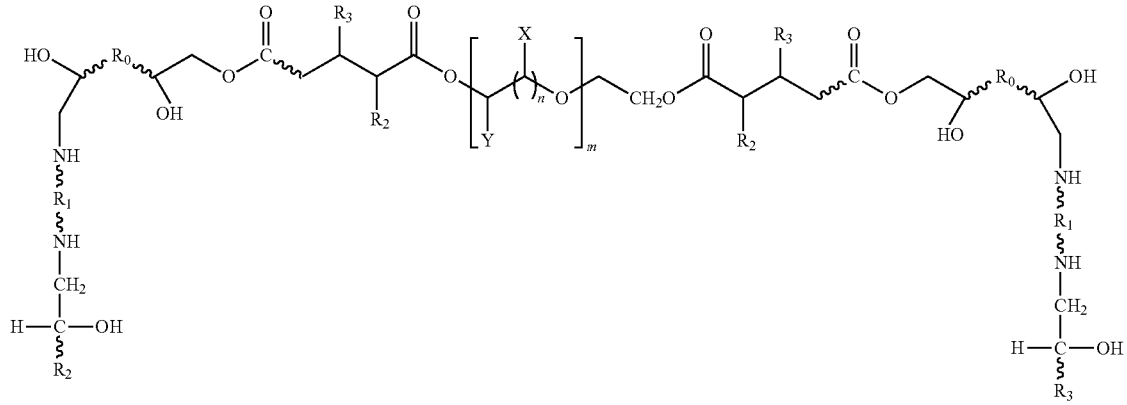

7. The curing agent composition according to claim 6, wherein the monofunctional epoxy compound is selected from a group consisting of 1,2-hexene oxide, 1,2-heptene oxide, iso-heptene oxide, 1,2-octene oxide, 1, 2-dodecene monoxide, 1,2-pentadecenylene oxide, butadiene monoxide, isoprene monoxide, styrenated oxide, methyl glycidyl ether, ethyl glycidyl ether, phenyl glycidyl ether, n-butyl glycidyl ether, tolyl glycidyl ether, isopropyl glycidyl ether, benzyl glycidyl ether, glycidyloxypropyl trimethoxysilyl, octyl glycidyl ether, nonyl glycidyl ether, decyl glycidyl ether, dodecyl glycidyl ether, tetradecyl glycidyl ether, p-tert-butylphenyl glycidyl ether, and o-tolyl glycidyl ether.

8. A curing agent coating formula, including:
10 to 30 wt % of aqueous epoxy resin;
1 to 10 wt % of the curing agent composition according to claim 1;
0.1 to 5 wt % of dispersant;
1 to 5 wt % of rheological agent;
1 to 10 wt % of film forming agent;
5 to 30 wt % of solvent; and
10 to 70 wt % of metal powder.

9. The curing agent coating formula according to claim 8, wherein the metal powder is selected from a group consisting of zinc powder, aluminum powder, and magnesium powder.

10. The curing agent coating formula according to claim 8, wherein the film-forming agent is selected from a group consisting of propylene glycol monomethyl ether or dipropylene glycol butyl ether.

\* \* \* \* \*